(12) United States Patent
Konetski et al.

(10) Patent No.: US 10,365,975 B2
(45) Date of Patent: Jul. 30, 2019

(54) BACKUP DATA SECURITY CLASSIFCATION

(71) Applicant: Dell Products, L.P., Round Rock, TX (US)

(72) Inventors: David Konetski, Austin, TX (US); Carlton A. Andrews, Austin, TX (US); Ricardo L. Martinez, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 161 days.

(21) Appl. No.: 15/453,862

(22) Filed: Mar. 8, 2017

(65) Prior Publication Data

US 2018/0260284 A1    Sep. 13, 2018

(51) Int. Cl.
*G06F 16/30* (2019.01)
*G06F 11/14* (2006.01)
*G06F 16/80* (2019.01)

(52) U.S. Cl.
CPC ...... *G06F 11/1458* (2013.01); *G06F 11/1448* (2013.01); *G06F 16/80* (2019.01)

(58) Field of Classification Search
CPC .................. G06F 11/1448; G06F 11/1458
See application file for complete search history.

(56) References Cited

U.S. PATENT DOCUMENTS

| 9,934,099 | B1* | 4/2018 | Sharma | G06F 11/1458 |
| 2007/0271316 | A1* | 11/2007 | Hollebeek | G06F 11/1464 |
| 2013/0018946 | A1* | 1/2013 | Brown | G06F 11/1451 |
| | | | | 709/203 |
| 2015/0347447 | A1* | 12/2015 | Ho | G06F 16/122 |
| | | | | 707/622 |
| 2016/0335283 | A1* | 11/2016 | Rabinovich | G06F 17/30129 |
| 2017/0277596 | A1* | 9/2017 | Kyathanahalli | G06F 11/1453 |

OTHER PUBLICATIONS

Article entitled "Carbonite adds remote management, makes life easier for IT admins", dated Sep. 9, 2015, by Zajac.*
Article entitled "Syncplicity StorageVaults Deliver File Sync and Share Storage Control", dated Nov. 25, 2013, by Syncplicity.*
Article entitled "Five Criteria for Selecting an Endpoint Backup Solution", by Pixius, dated Jun. 8, 2013.*

* cited by examiner

*Primary Examiner* — Mahesh H Dwivedi
(74) *Attorney, Agent, or Firm* — Fogarty LLP

(57) ABSTRACT

Systems and methods for backup data security classification. In an illustrative, non-limiting embodiment, an Information Handling System (IHS) may include one or more processors and a memory coupled to the one or more processors, the memory including program instructions stored thereon that, upon execution by the one or more processors, cause the IHS to: receive a backup policy that includes a plurality of backup profiles, where each of the plurality of backup profiles corresponds to a different user within an organization, and store a copy of electronic data associated with a given one of the different users according to a backup profile.

20 Claims, 3 Drawing Sheets

BACKUP DATA SECURITY CLASSIFCATION

FIELD

The present disclosure generally relates to Information Handling Systems (IHSs), and, more particularly, to systems and methods for backup data security classification.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes.

Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc.

In addition, IHSs may include a variety of hardware and software components that may be configured to process, store, and communicate information; and may include one or more computer systems, data storage systems, and/or networking systems.

In today's fast-paced world, the "backing up" of electronic files and data handled or processed by IHSs becomes of the utmost importance. At any given time, files and data may be subject to theft, natural disasters, accidental deletion, hostile encryption by ransomware virus, etc. To prepare for these types of undesirable events, a backup strategy may be put in place to reduce the risk of loss.

As identified by the inventors hereof, however, when attempting to apply security concepts of confidentiality, integrity, and availability to data backup, there is not a "one-size-fits-all" solution. Although certain existing backup and recovery applications and services may allow a limited number of backup configuration options, gross control over backup target details is often insufficient for an organization with many different levels and types of users and data. Also, it is not scalable to support complex backup needs, and does not take advantage of cost-savings and availability of global cloud-hosted backup. Moreover, current backup solutions do not allow flexible strategy/configurations based on risk.

To address these, and other concerns, the inventors hereof have developed systems and methods for backup data security classification.

SUMMARY

Embodiments of systems and methods for backup data security classification are described. In an illustrative, non-limiting embodiment, an Information Handling System (IHS) comprises one or more processors and a memory coupled to the one or more processors, the memory including program instructions stored thereon that, upon execution by the one or more processors, cause the IHS to: receive a backup policy that includes a plurality of backup profiles, each of the plurality of backup profiles corresponds to a different user within an organization, and store a copy of electronic data associated with a given one of the different users according to a backup profile. For example, the backup policy may include an Extensible Markup Language (XML) file.

In some cases, the given user may be classified by rank or position within the organization, and the backup profile may be selected among a plurality of other backup profiles associated with different ranks or positions. For example, a first rank or position may include an executive role, the given user may include an executive employee of the organization, and the backup profile may include first backup rules specific to employees exercising the executive role.

The first backup rules, when executed, may cause the IHS to route the copy of the data to at least two different storage locations, a first storage location configured to store a number of copies of the data, and a second storage location configured to store a different number of copies of the data. A second rank or position may include a non-executive role, the given user may include a non-executive employee of the organization, and a second selected backup profile may include a second set of backup rules specific to employees exercising the non-executive role.

The second set of backup rules, when executed, may cause the IHS to route the copy of the data to a single storage location in a cloud or network.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

In various embodiments, the systems and methods described herein may provide techniques for configuring a backup target policy based on risk, for example, based upon a classification and/or categorization of data. A backup target policy may be created by the data owner or security officer, and may include a set of data evaluation criteria and target definitions.

Examples of evaluation criteria may be based on several factors including, but not limited to: (1) data criticality to the business, (2) security classification/sensitivity, (3) data owner role, and/or (4) data physical origin. Examples of target definitions may include, but are not limited to: (1) the number of redundant copies of data backup, (2) the specific type of backup media, and/or (3) the backup physical or logical location whitelists or blacklists.

These and/or other factors may be provisioned into a data backup profiling system, as described in more detail below, and which in some cases may be integrated into a backup software or Software as a service (SaaS) solution. Such data backup profiling system may determine where the data backup of a given set of data is stored, how many copies of the data should be stored, and so on.

Figure 1:
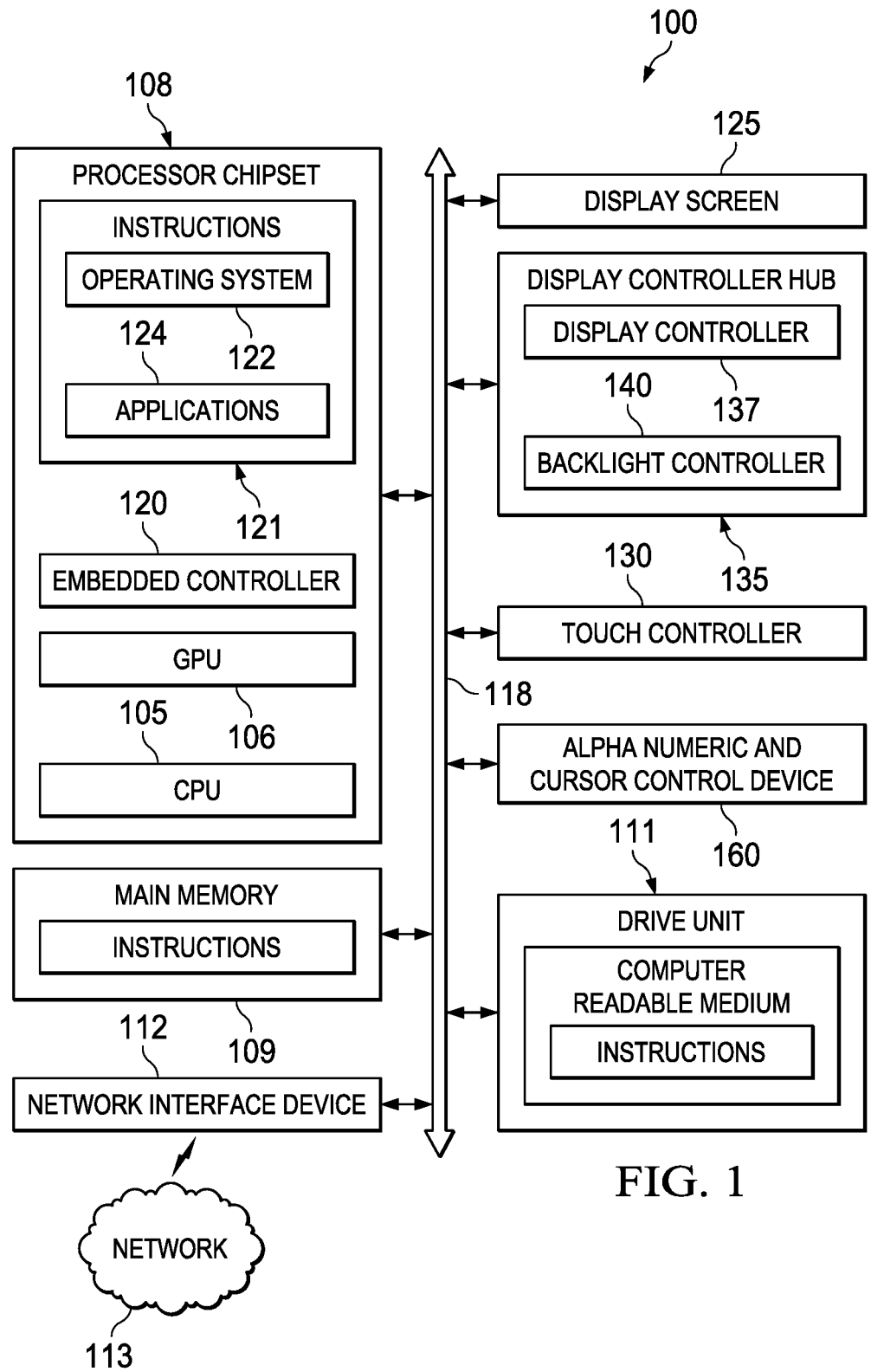
FIG. 1 is a diagram of an example of an Information Handling System (IHS) configured according to some embodiments.

Turning now to FIG. 1, a diagram of an Information Handling System (IHS) 100 configured to provide systems and methods for provide backup data security classification is depicted. In various embodiments, IHS 100 may include a set program instructions that can be executed to cause IHS 100 to perform any one or more of the methods or operations disclosed herein.

In various environments, IHS 100 may be implemented using electronic devices that provide voice, video or data communications. Further, while a single IHS 100 is illustrated, the term "system" shall also be taken to include any collection of systems or sub-systems that individually or jointly execute a set, or multiple sets, of instructions to perform one or more computer operations.

IHS 100 includes main memory 109, one or more processing resources such as a Central Processing Unit (CPU) 105 or hardware or software control logic, and operates to execute code. Additional components of IHS 100 may include one or more storage devices such as static memory or disk drives 111. These memory devices 109 and/or 111 can store code and data. In various embodiments, devices 109 and/or 111 may be implemented using any suitable memory technology, such as static RAM (SRAM), synchronous dynamic RAM (SDRAM), nonvolatile/Flash-type memory, or any other type of memory.

Storage device 111 may be an internal or external device coupled to IHS 100 via a local bus or port. For example, such a bus or port may include implementations of various version of the Universal Serial Bus (USB) protocol. Additionally or alternatively, storage device 111 may include a Common Internet File System (CIFS) and/or Network-Attached Storage (NAS).

Other components of IHS 100 may include one or more communications ports for communicating with external devices as well as various input and output (I/O) devices. I/O devices may include alphanumeric and cursor control devices 160 such as a keyboard, a touchpad, a mouse, one or more video display devices 125, display touchscreen(s) with touch controllers 130, etc. IHS 100 may also include one or more buses 118 operable to transmit communications between the various hardware components.

Again, IHS 100 may include one or more processing resources such as CPU 105, Graphics Processing Unit (GPU) 106 that may or may not be integrated with CPU 105, and related chipset(s) 108 or hardware or software control logic.

In various embodiments, IHS 100 may be a single-processor system including one CPU or a multi-processor system including two or more CPUs (e.g., two, four, eight, or any other suitable number). CPU(s) 105 may include any processor capable of executing program instructions. For example, in various embodiments, CPU(s) 105 may be general purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 105 may commonly, but not necessarily, implement the same ISA.

IHS 100 may include several sets of instructions 121 to be run by CPU 105, GPU 106, and/or any embedded controllers 120 on IHS 100. One such set of instructions includes Operating System (OS) 122 with an OS interface.

Examples of OSs 122 may include those used with typical mobile computing devices such as WINDOWS mobile OS from MICROSOFT CORPORATION and ANDROID OS from GOOGLE, INC. Additional sets of instructions in the form of multiple software applications 124 may be run by IHS 100. These applications 124 may enable multiple uses of IHS 100.

IHS 100 may operate as a standalone device or may be connected to other computer systems or peripheral devices. IHS 100 can represent a server device whose resources can be shared by multiple client devices, or it can represent an individual client device, such as an individual mobile personal computing system.

Network interface device 112 may include a wireless cellular or mobile networks (CDMA, TDMA, etc.), WIFI, WLAN, LAN, or similar network connection, enabling a user to communicate via a wired or wireless communications network 113, such as the Internet. IHS 100 may be configured with conventional web browser software. The web browser may include for example MICROSOFT's Internet Explorer web browser software, FIREFOX or similar such browsers to allow the user to interact with websites via network 113.

IHS 100 also includes one or more display devices 125 that may utilize LCD, OLED, or other thin film technologies. Each display device 125 may be capable of touch input via touch controller 130. Each display device 125 has a display controller hub 135. The display controller hub 135 may include control logic and software or access separate control logic and software. Components may include a display controller or driver 137 and a backlight controller 140 for LCD thin film display technologies or a brightness controller for OLED/AMOLED technologies.

One or more parts of the display controller hub 135 may be operated by or integrated with one or more graphics processing units (GPUs) 106 such as those that are part of the chipset 108. Display device 125 and one or more parts of display controller hub 135 may also be controlled by embedded controller 120 of chipset 108. Each GPU 106 and display controller/driver 137 is responsible for rendering graphics such as software application windows and virtual tools on display device 125.

In various embodiments, devices 109 and/or 111 may include one or more "files systems." As used herein, the term "files system" refers to systems and data structures that OS 122 uses to keep track of "files" on a given disk or storage partition; that is, the way the files are organized. Generally speaking, a file system may include one or more kernel-mode components that are executed as part of an OS (e.g., WINDOWS). A "file system driver" (which is an entirely distinct entity from other entities known in the art as "device drivers," despite the otherwise similar nomenclature), may be configured to filter I/O operations for one or more file systems or file system volumes present in a storage device. In other words, a file system filter driver may be executed in conjunction with one or more file systems to manage file I/O operations, usually under control of OS 122, and often in response to upon requests received via applications 124.

As such, a file system may be used to control how data is stored and retrieved, and each group of data is called a "file." For example, a file system may separate the data into pieces. By giving each piece a name, the information can then be identified. Again, there is a structure and set of logic rules used to manage the groups of information, and these are collectively referred to a "file system."

There are various types of file systems in use today. Each may file system have its own different structure and logic, properties of speed, flexibility, security, size, etc. Some file systems have been designed to be used for specific applications. For sake of illustration, for example, the International Organization for Standardization (ISO) 9660 file system is designed specifically for handling storage and retrieval of data to and from optical discs or the like. More generally, however, different file systems may be used on numerous different types of storage devices that use different kinds of media and devices, such as devices 109 and/or 111.

Consequently, IHS 100 may be designed or configured to implement the various techniques described herein, while at the same leveraging standard attached and mounted file systems, which may utilize different but otherwise common file systems and storage protocols.

Backup applications or services are computer programs used to perform data backup; they create supplementary copies of data stored in files, databases, and/or the entire IHS 100. These programs may later use the supplementary copies to restore the original contents in the event of data loss or when an earlier version of a file is needed for some business purpose. In some cases, any of the many backup applications or services that are commercially available may be executed by IHS 100 (for example, as one of application(s) 124). And, in many cases, such a backup application or service may be modified, adapted, or created from scratch to perform one or more of the many techniques described below.

Figure 2:
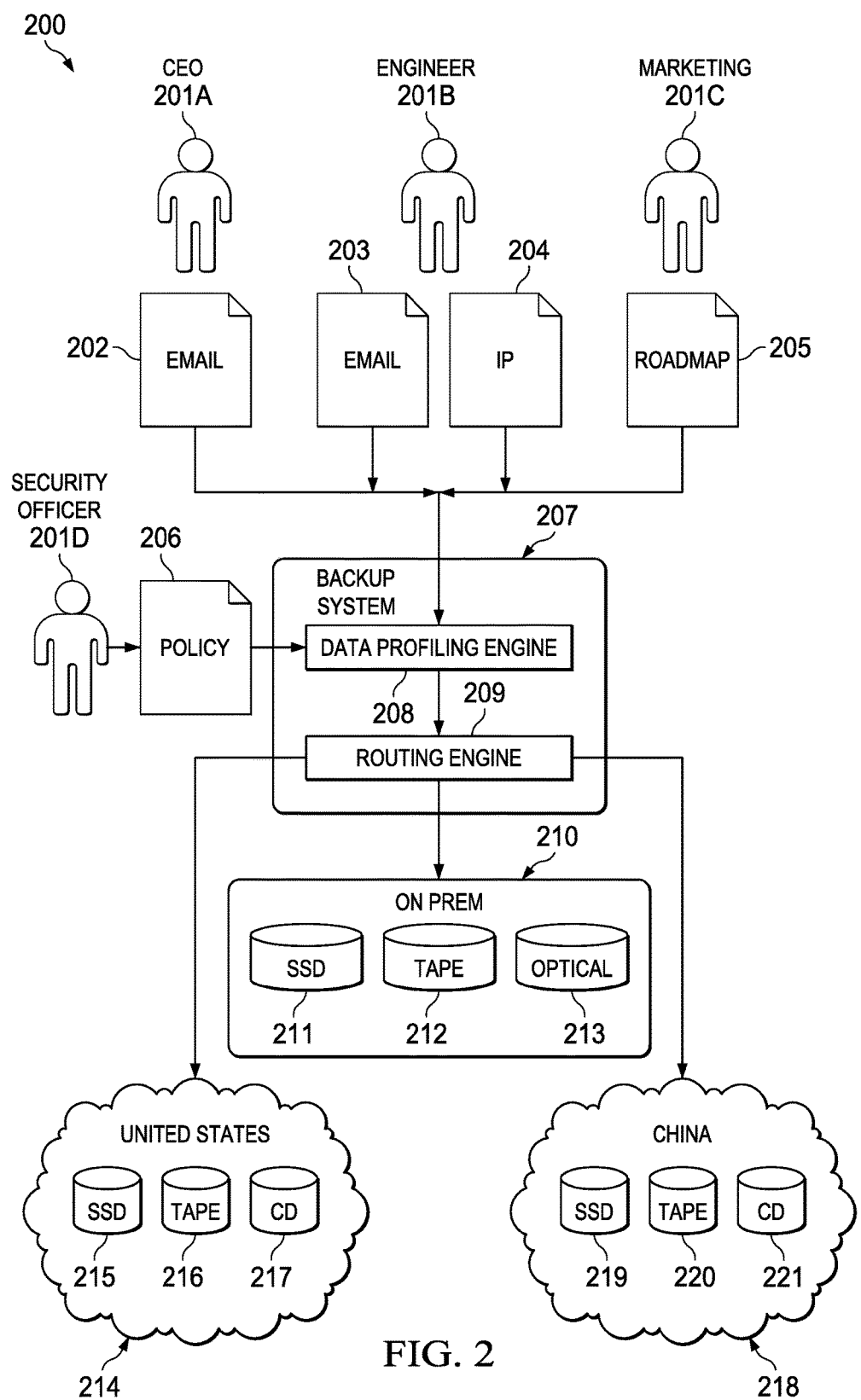
FIG. 2 is a diagram of an example of a backup data security classification environment according to some embodiments.

FIG. 2 is a diagram of an example of backup data security classification environment 200. In some embodiments, backup system 207 and several other components of environment 200 may be implemented, at least in part, using an instance of IHS 100 and/or software applications executed by IHS 100.

As shown, Chief Executive Officer (CEO) 201A, Engineer 201B, Marketing Director 201C, and Security Officer 201D may be users or employees of a given organization, each person having their own distinct roles.

For example, CEO 201A may be the highest-ranking person in that organization, ultimately responsible for making managerial decisions. Engineer 201B may design, build, or maintain products or services that the organization provides to customers or that itself uses in the course of business operations. Marketing Director 201C may be responsible for developing marketing strategies, studying economic indicators, tracking changes in supply and demand, identifying customers and their current and future needs, monitoring the competition, etc. Security Officer 201D may be responsible for developing and implementing an information security program, including, for example, procedures and policies designed to protect enterprise communications, systems and assets from both internal and external threats, and to manage backup, disaster, recovery, or business continuity plans.

For example, Security Officer 201D may create or modify backup policy 206, which is in turn provided to data profiling engine 208 of backup system 207. In some implementations, backup policy 206 may be in the form of an Extensible Markup Language (XML) file or the like.

During the normal course of business, CEO 201A creates, opens, modifies, or otherwise manipulates email 202, Engineer 201B creates, opens, modifies, or otherwise manipulates email 203 and Intellectual Property (IP) disclosure document 204, and Marketing Director 201C creates, opens, modifies, or otherwise manipulates a marketing roadmap slideshow document 205. When backup system 207 begins performing its backup operations (e.g., upon the saving of any document, at every hour, once a week, etc.) it may use backup policy 206 to backup data stored by the organization, for instance, by applying different backup profiles corresponding to users 201A-201C to the different types of data 202-205.

To that end, each backup profile specified in backup policy 206 may be configured to provide, to routing engine 209, instructions about where to transmit and/or recover backed-up data from. In this example, routing engine 209 has an a connection to "on-premises" storage facility having Solid-State Drive (SSD) storage device(s) 211, Tape or Magnetic storage device(s) 212, and optical storage device(s) 213. Routing engine 209 also has access to cloud or network 214 in a first remote location (e.g., "United States") having Solid-State Drive (SSD) storage device(s) 215, Tape or Magnetic storage device(s) 216, and optical storage device(s) 217. In addition, routing engine 209 has access to cloud or network 218 in a second remote location (e.g., "China") having Solid-State Drive (SSD) storage device(s) 219, Tape or Magnetic storage device(s) 220, and optical storage device(s) 221.

Figure 3:
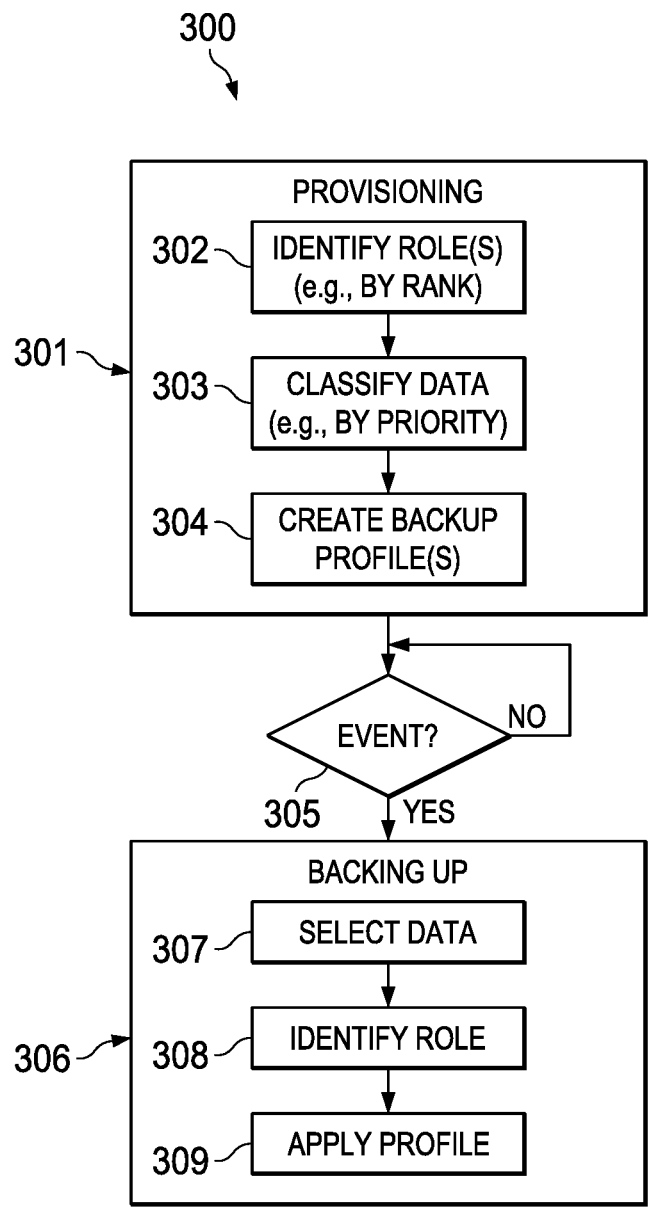
FIG. 3 is a flowchart of an example of a backup data security classification method according to some embodiments.

To illustrate operation of system 200, FIG. 3 is a flowchart of an example of backup data security classification method 300. In some embodiments, method 300 may be performed, at least in part, by backup system 207 of FIG. 2.

During provisioning 301, method 300 includes identifying user roles 302 (e.g., by employee rank, by position, etc.), classifying data 303 to be backed-up (e.g., by priority, by type, etc.), and creating backup profile(s) 304 (e.g., a different profile for each employee or user). In some cases, backup profile templates may be used for classes of employees (e.g., all engineers, all managers, all executives, etc.), and instances of the template may be modified to create individual backup profiles for each individual person within that same class.

The foregoing operations may be performed, for example, by Security Officer 201D when creating or modifying backup policy 206. In many situations, creating an entire policy may involve several iterations of one or more of operations 302-304.

At block 305, method 300 determines whether a backup triggering event is detected. For example, a backup triggering event may include a time-based event (e.g., a certain time of day, day of the week, every hour, every day, and so on), an action-based event (e.g., upon modification or saving of a file, etc.), or any other configurable event (e.g., based on a present or upcoming power outage, present or forecast weather, etc.). If no such event is detected, control remains within block 305. Otherwise, control is passed to block 306.

During backup phase 306, method 300 may include selecting data 307, identifying the role or rank of user(s) 308 (e.g., position within the organization) associated with the selected data, and applying a backup profile 309 to that data. In many implementations, backup phase 306 may involve several iterations of one or more of operations 307-309, executed by data profiling engine 208 and routing engine 209.

Examples

To illustrate operation of one or more aspects of the execution of method 300 (FIG. 3) by IHS 100 (FIG. 1) within system 200 (FIG. 2), consider the following examples:

First, assume that, within a given enterprise, a Security Officer develops a backup profile policy based on the organization's data security needs, roles, and use cases.

Roles may be tiered based on sensitivity classification per role. For instance, CEO emails may be classified as business critical for both integrity and confidentiality reasons. Engineers' daily emails may be less critical, and may make up a large percentage of the organization's data amount. On the other hand, Intellectual Property (IP) disclosures from the same Engineers may be considered business critical for integrity reasons. Meanwhile, Marketing roadmaps may be business critical for confidentiality reasons, and there may be regional protection concerns.

At some point, the Security Officer would make or create the appropriate selections and rules to generate such a profile policy, for example, in the form of an XML file or the like, which would be then sent to the data profiling engine, and which in turn may be integrated into the backup solution or software.

When the backup solution is being executed, backup data may be stored and replicated based upon: (1) a data profiling policy, (2) a data profiling engine, and/or (3) a data routing engine. Profiling and routing engine routes backup location and redundancy based on backup policy. In this example, CEO emails may be stored "on premises" and in a US-based cloud, with many different copies on various media, while Engineers' emails may be stored on a global cloud, Engineers' IP disclosures may be stored on premises and also in the US-based cloud with reduced redundancy, and Marketing roadmaps may be stored on premises and also in the US-based cloud.

For instance, the profiling and routing engines, when in operation, may cause the CEO's email 202 to be stored in three different locations (e.g., a copy of the same email in each of devices 211-213) on premises 210, and also in any two different locations (e.g., a copy on each of any two of devices 215-217) on cloud 214. Moreover, the Engineer's email 203 may be stored in any two different locations (e.g., a copy on each of any two of devices 215-217) on cloud 214, and any two different locations (e.g., a copy on each of any two of devices 219-221) on cloud 218. The Engineer's IP disclosure 204 may be stored in any two different locations (e.g., a copy on each of any two of devices 211-213) on premises 210, and on a single location (e.g., a copy on any of devices 215-217) on cloud 214. The Marketing roadmap 205 may also be stored in any two different locations (e.g., a copy on each of any two of devices 211-213) on premises 210, and on a single location (e.g., a copy on any of devices 215-217) on cloud 214.

In another example, consider an environment where more than one person manipulates the same data (e.g., the same electronic document or file), but that each person has a different role within the enterprise. In this case, the Security Officer's policy may be configured to identify the users (e.g., by receiving information from the OS or file system as to which persons created, edited, modified, saved, deleted, etc.) that have manipulated that data, it may take a number of different actions. For instance, the policy may be configured such that different instances of the data may be backed up following different corresponding profiles. Additionally or alternatively, the policy may be configured such that only one version of the data is backed up, but following the safest profile (e.g., the CEO's profile as opposed to an Engineer's). Additionally or alternatively, the policy may be configured such that only one version of the data is backed up, but following the least safe profile (e.g., an Engineer's profile as opposed to a CEO's).

In yet another example, consider a situation where an employee changes ranks within the same organization. For instance, an Engineer may transition into a new job as CEO. In that case, the backup policy may include rules that, when executed, cause a new "CEO" backup profile to be applied to that person, so the new profile applies to his or her data from that point in time forward. Additionally or alternatively, these rules may cause the new "CEO" backup profile to be applied "retroactively" with respect to data stored before the transition, for instance, at least with respect data that has already been backed up using the previous, Engineer profile (e.g., all of that person's data that has not already been lost or compromised, and is still either locally or remotely stored).

Still relating to the previous example, it should be noted that not only may a new profile be used after the transition, but also both profiles may continue to be used during a "transition period" (e.g., a week between jobs) so that stored data may be backed up according to both profiles during that time. Additionally or alternatively, different rules within each different profile may be applied to the same data concurrently. Additionally or alternatively, different profiles and/or rules may be applied to different classifications of data, as previously discussed.

In still another example, the data to be backed-up may "belong" to different users, insofar as two or more users may have created, edited, opened, modified, or otherwise handled that same data. For instance, a given file residing in the cloud may be manipulated by both an Engineer and a CEO, perhaps at different times or from different places. In that situation, both the CEO and the Engineer's backup profiles may apply to that same file. Accordingly, in some cases, the data routing engine may perform a "profile de-duplication" operation to render redundant storage of selected file in various backup locations unnecessary (e.g., so as not to have two or more copies of those file in the same storage location or device solely due only to those locations being part of similar rules in two or more profiles).

Accordingly, in various embodiments, features that may be implemented using systems and methods described herein may include, but not limited to: (1) target policy provisioning and management in a data backup and recovery solution, (2) classification, sensitivity, and/or owner risk criteria may be mapped to specific backup targets, (3) data duplication or redundancy policy based on any of the aforementioned criteria, and/or (4) a backup profiling system to evaluate data classification and map to pre-established profiles.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A hardware memory device having program instructions stored thereon that, upon execution by an Information Handling System (IHS), cause the IHS to:
receive a backup policy that includes a plurality of backup profiles, wherein each of the plurality of backup profiles corresponds to a different user within an organization;
store a copy of a first portion of original electronic data associated with a given one of the different users according to a first backup profile previously associated with the given user based upon the given user's previous role in the organization, in response to a date of the first portion of the original electronic data preceding a date of transition of the given user from the previous role into a current role;
store a copy of a second portion of the original electronic data associated with the given user according to a second backup profile currently associated with the given user based upon the given user's current role, in response to a date of the second portion of the original electronic data postdating the date of transition; and
in response to an indication of data loss, restore the original electronic data.

2. The hardware memory device of claim 1, wherein the backup policy comprises an Extensible Markup Language (XML) file.

3. The hardware memory device of claim 1, wherein the given user is classified by rank or position within the organization, and wherein the backup profile is selected among a plurality of other backup profiles associated with different ranks or positions.

4. The hardware memory device of claim 3, wherein the previous role comprises an executive role, wherein the current role comprises a non-executive role, wherein the first backup profile comprises first backup rules specific to employees exercising the executive role, and wherein the second backup profile comprises second backup rules specific to employees exercising the non-executive role.

5. The hardware memory device of claim 4, wherein the first backup rules cause the IHS to route the copy of the data to at least two different storage locations, a first storage location configured to store a number of copies, and a second storage location configured to store a different number of copies.

6. The hardware memory device of claim 4, wherein the previous role comprises a non-executive role, wherein the current role comprises an executive role, wherein the first backup profile comprises first backup rules specific to employees exercising the non-executive role, and wherein the second backup profile comprises second backup rules specific to employees exercising the executive role.

7. The hardware memory device of claim 6, wherein the second backup rules cause the IHS to route the copy of the data to a single storage location in a cloud or network.

8. A computer-implemented method, comprising:
receiving a backup policy that includes a plurality of backup profiles, wherein each of the plurality of backup profiles corresponds to a different user within an organization;
determining that a given one of the different users is presently under a transition period;
storing a copy of original electronic data associated with the given user according to a first backup profile previously associated with the given user based upon the given user's previous role in the organization prior to the transition period;
storing another copy of the original electronic data according to a second backup profile to be associated with the given user based upon the given user's future role in the organization after the transition period; and
in response to an indication of data loss, restoring the original electronic data.

9. The computer-implemented method of claim 8, wherein the backup policy comprises an Extensible Markup Language (XML) file.

10. The computer-implemented method of claim 8, wherein the given user is classified by rank or position within the organization, and wherein the backup profile is selected among a plurality of other backup profiles associated with different ranks or positions.

11. The computer-implemented method of claim 10, wherein the previous role comprises an executive role, wherein the first backup profile comprises first backup rules specific to employees exercising the executive role, and wherein the first backup rules cause the IHS to route the copy of the original electronic data to at least two different storage locations, a first storage location configured to store a number of copies, and a second storage location configured to store a different number of copies.

12. The hardware memory device of claim 11, wherein the future role comprises a non-executive role, and wherein a second selected backup profile comprises a second set of backup rules specific to employees exercising the non-executive role.

13. The computer-implemented method of claim 11, wherein the second set of backup rules cause the IHS to route the other copy of the original electronic data to a single storage location in a cloud or network.

14. An Information Handling System (IHS), comprising:
one or more processors; and
a memory coupled to the one or more processors, the memory including program instructions stored thereon that, upon execution by the one or more processors, cause the IHS to:
receive a backup policy that includes a plurality of backup profiles, wherein each of the plurality of backup profiles corresponds to a different user within an organization;
store a copy of a first portion of original electronic data associated with a given one of the different users according to a first backup profile previously associated with the given user based upon the given user's previous role in the organization, in response to a date of the first portion of the original electronic data preceding a date of transition of the given user from the previous role into a current role;

store a copy of a second portion of the original electronic data associated with the given user according to a second backup profile currently associated with the given user based upon the given user's current role, in response to a date of the second portion of the original electronic data postdating the date of transition; and in response to an indication of data loss, restore the original electronic data.

15. The IHS of claim 14, wherein the backup policy comprises an Extensible Markup Language (XML) file.

16. The IHS of claim 14, wherein the given user is classified by rank or position within the organization, and wherein the backup profile is selected among a plurality of other backup profiles associated with different ranks or positions.

17. The IHS of claim 16, wherein the previous role comprises an executive role, wherein the current role comprises a non-executive role, wherein the first backup profile comprises first backup rules specific to employees exercising the executive role, and wherein the second backup profile comprises second backup rules specific to employees exercising the non-executive role.

18. The IHS of claim 17, wherein the first backup rules cause the IHS to route the copy of the data to at least two different storage locations, a first storage location configured to store a number of copies, and a second storage location configured to store a different number of copies.

19. The IHS of claim 17, wherein the previous role comprises a non-executive role, wherein the current role comprises an executive role, wherein the first backup profile comprises first backup rules specific to employees exercising the non-executive role, and wherein the second backup profile comprises second backup rules specific to employees exercising the executive role.

20. The IHS of claim 19, wherein the second backup rules cause the IHS to route the copy of the data to a single storage location in a cloud or network.

* * * * *